United States Patent
Tong

(10) Patent No.: US 7,365,514 B2
(45) Date of Patent: Apr. 29, 2008

(54) BATTERY CHARGER

(75) Inventor: Gabriel Yui Lung Tong, Kowloon (HK)

(73) Assignee: Totex Design Limited, Hong Kong (HK)

( * ) Notice: Subject to any disclaimer, the term of this patent is extended or adjusted under 35 U.S.C. 154(b) by 401 days.

(21) Appl. No.: 10/972,478

(22) Filed: Oct. 26, 2004

(65) Prior Publication Data

US 2006/0087281 A1    Apr. 27, 2006

(51) Int. Cl.
*H02J 7/00* (2006.01)

(52) U.S. Cl. .............. 320/110; 320/106; 320/107; 320/112; 320/114; 320/111; 429/99; 429/100; 307/150; D13/103; D13/107; D13/108

(58) Field of Classification Search ............ 320/2, 320/107, 110, 112, 116, 114, 106, 111; 429/99, 429/100; 307/150; D13/103, 107, 108
See application file for complete search history.

(56) References Cited

U.S. PATENT DOCUMENTS

| | | | |
|---|---|---|---|
| 3,209,230 A * | 9/1965 | Mas ........................ 320/110 |
| 3,967,195 A * | 6/1976 | Averitt et al. ............. 324/508 |
| 5,072,347 A * | 12/1991 | Brunson .................... 362/194 |
| 5,122,721 A * | 6/1992 | Okada et al. ............. 320/111 |
| 5,144,217 A * | 9/1992 | Gardner et al. ........... 320/110 |
| 5,189,358 A * | 2/1993 | Tomura et al. ............ 320/115 |
| 5,306,576 A * | 4/1994 | Sasaki ...................... 429/98 |
| 5,331,580 A * | 7/1994 | Miller et al. .............. 708/173 |
| 5,350,993 A * | 9/1994 | Toya et al. ................ 320/106 |
| 5,525,888 A * | 6/1996 | Toya ......................... 320/111 |
| 5,592,064 A * | 1/1997 | Morita ...................... 320/110 |
| 5,635,814 A * | 6/1997 | Afzal et al. ............... 320/111 |
| 5,686,808 A * | 11/1997 | Lutz ......................... 320/110 |
| 5,689,171 A * | 11/1997 | Ludewig ................... 320/110 |
| 5,739,596 A * | 4/1998 | Takizawa et al. ......... 307/66 |
| 5,844,472 A * | 12/1998 | Lee .......................... 340/438 |
| 5,923,146 A * | 7/1999 | Martensson .............. 320/111 |
| 6,204,632 B1 * | 3/2001 | Nierescher et al. ....... 320/116 |
| 6,430,813 B2 * | 8/2002 | Muraguchi et al. ...... 30/43.92 |
| 6,556,119 B1 * | 4/2003 | Lell .......................... 337/157 |
| 6,583,600 B2 * | 6/2003 | Haga et al. ............... 320/110 |
| 7,233,126 B2 * | 6/2007 | Tashiro .................... 320/106 |
| 2002/0067151 A1 * | 6/2002 | Tanishita ................... 320/114 |
| 2003/0193316 A1 * | 10/2003 | Guo et al. ................. 320/112 |
| 2004/0004458 A1 * | 1/2004 | Tanaka et al. ............ 320/106 |
| 2004/0056636 A1 * | 3/2004 | Hsu .......................... 320/107 |
| 2004/0073275 A1 * | 4/2004 | Maltan et al. ............ 607/57 |
| 2004/0164704 A1 * | 8/2004 | Yang ......................... 320/104 |
| 2005/0116684 A1 * | 6/2005 | Kim .......................... 320/114 |

* cited by examiner

*Primary Examiner*—Akm Ullah
*Assistant Examiner*—M'baye Diao
(74) *Attorney, Agent, or Firm*—Dobe Law Group, LLC; Christopher Aniedobe

(57) ABSTRACT

A universal battery charger is described for accommodating a range of batteries. An adapter or connector is provided for each different type of battery which engages the standard housing including the main power supply. The adapter includes electronics which control the charging process, customised for each battery type. The adapter forms the front part of the charger and slides in from the front.

14 Claims, 4 Drawing Sheets

BATTERY CHARGER

FIELD OF THE INVENTION

The present invention relates to battery chargers, particularly though not solely to a charger capable of charging different sizes and types of batteries.

BACKGROUND ART

It is known in the art of charging batteries, that different types of batteries have different contact arrangements and charging requirements. For example U.S. patent application Ser. No. 2003/0117107 discloses an electrical component such as a battery charger for differently configured power tool batteries. There is circuitry for identifying particular battery chemistries; however, the mechanical interface is configured for a single battery connection type.

U.S. Pat. No. 5,926,005 discloses a battery charger incorporating an adapter that has different levels of engagement for accommodating various sizes of batteries.

U.S. Pat. No. 5,144,217 discloses a universal charger that accepts differently configured battery packs that are configured with at least one cell coaxially positioned with a specific terminal block assembly.

U.S. Pat. No. 3,696,283 discloses a battery charger assembly having charging modules that mate to a single power supply module. Each charging module is adapted for accommodating cells of a particular physical and electrical configuration.

U.S. Pat. No. 5,633,574 discloses a battery charger that utilizes spacers for positioning variously sized batteries within a charging cavity.

U.S. Pat. No. 5,280,229 discloses a battery charging device that includes separate adapter inserts for receiving correspondingly configured batteries.

U.S. Pat. No. 6,204,632 discloses a modular battery charging system in which each battery charging module is configured for a particular battery device.

U.S. Pat. No. 6,380,711 discloses a battery charger that performs a series of tests for determining the type of battery being charged.

United States Patent Publication No. 2003/0090234 discloses a battery charger having a protective structure.

United States Patent Publication No. 2002/0158605 discloses a rechargeable flashlight and charging assembly that holds, charges, and maintains the charge of an auxiliary battery compatible with the flashlight.

SUMMARY OF THE INVENTION

It is therefore an object of the present invention to overcome any disadvantages in the prior art or which will at least provide the public with a useful choice.

Accordingly, in a first aspect, the present invention comprises a battery charger comprising:

a housing including a power supply configured to receive a supply voltage and provide a lower voltage at a connection terminal;

a battery connector configured to engage said housing and receive a predetermined type of battery; and a charging controller with said connector receiving said lower voltage from said connection terminal and provide a charging voltage to said battery through a battery terminal appropriate for the battery type of the battery said connector is configured to receive.

Preferably said battery charger further comprises a plurality of interchangeable battery connectors to accommodate a plurality of different batteries, and said housing is configured to receive said plurality of connectors.

Preferably each connector is configured for charging a battery of a specific capacity, voltage, chemical and/or form factor.

Preferably said battery charger further comprises a transparent portion of said housing such that interior of said housing may be visible externally.

Preferably said battery charger further comprises a latch or button for locking said connector in place and an indicator of charging condition within said latch or button.

In a second aspect, the present invention comprises a battery charger comprising:

a housing including a power supply configured to receive a supply voltage and provide a lower voltage at a connection terminal;

a battery connector configured to receive said lower voltage from said connection terminal, engage said housing, receive a predetermined type of battery and provide a charging voltage to said battery through a battery terminal; and wherein said connector is configured to provide a continuation of said housing and thereby constitute a front portion thereof.

Preferably said battery charger further comprises a backplate including exhaust holes and said button or latch, wherein said exhaust holes are sheltered by said housing and an array of ventilating slots along the lower side edges of said housing are indented inward so that tiny objects cannot fall into said housing directly.

Preferably said battery charger further comprises an air passage between the underside of said housing and said back-plate for exhaust of hot air from the inside of said housing via said exhaust holes.

Preferably said battery charger further comprises concave recesses at the sides of said housing and said connector, each recess terminating along a contour of the upper side edges of said housing and said connector for easy gripping by fingers.

In a third aspect, the present invention comprises a battery charger comprising:

a housing including a power supply configured to receive a supply voltage and provide a lower voltage at a connection terminal;

a battery connector configured to receive said lower voltage from said connection terminal, engage said housing, receive a predetermined type of battery and provide a charging voltage to said battery through a battery terminal; and wherein said connector is configured to slide onto said housing from the front.

Preferably said battery charger further comprises at least two ridges on said housing in use serving as rails for said connector to slide and engage with corresponding V-shaped slots in said connector.

Preferably said battery charger further comprises undercuts at the end of said ridge to engage with corresponding hooks at the end of said V-shaped slots to engage said connector in a locked position with said housing.

Preferably said battery charger further comprises an interfacing connector sheath over said connection terminals including a hook in use for locking an interfacing connector opening of said connector when in said locked position.

Preferably said interfacing connector opening shelters male interfacing connector pins on four sides from accidental impact damage.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The invention consists in the foregoing and also envisages constructions of which the following gives examples only.

BRIEF DESCRIPTION OF THE DRAWINGS

Preferred embodiments of the present invention will now be described with reference to the accompanying drawings in which.

DETAILED DESCRIPTION OF THE PREFERRED EMBODIMENTS

Figure 1:
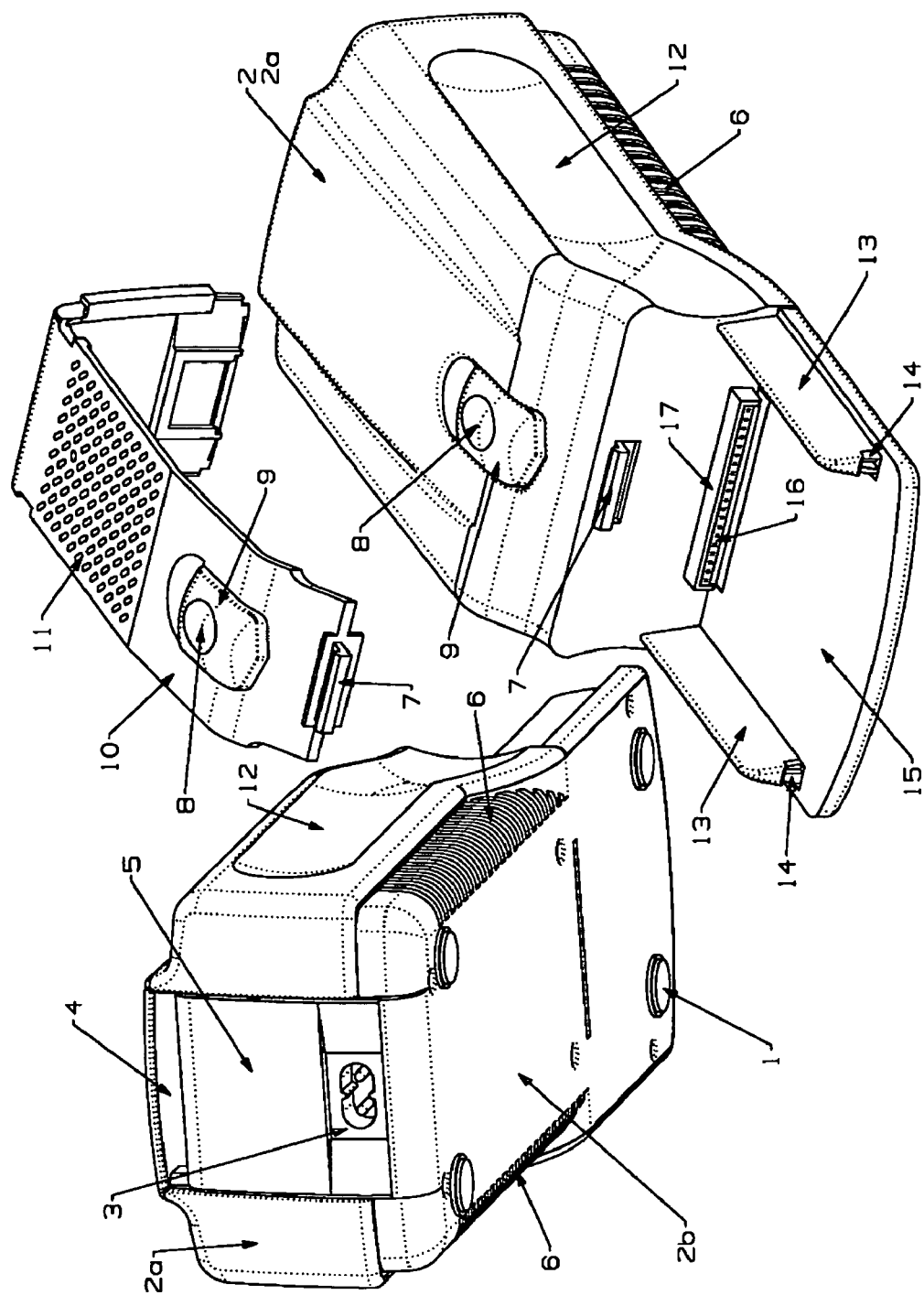
FIG. 1 is diagram of the main cabinet body.
Figure 2:
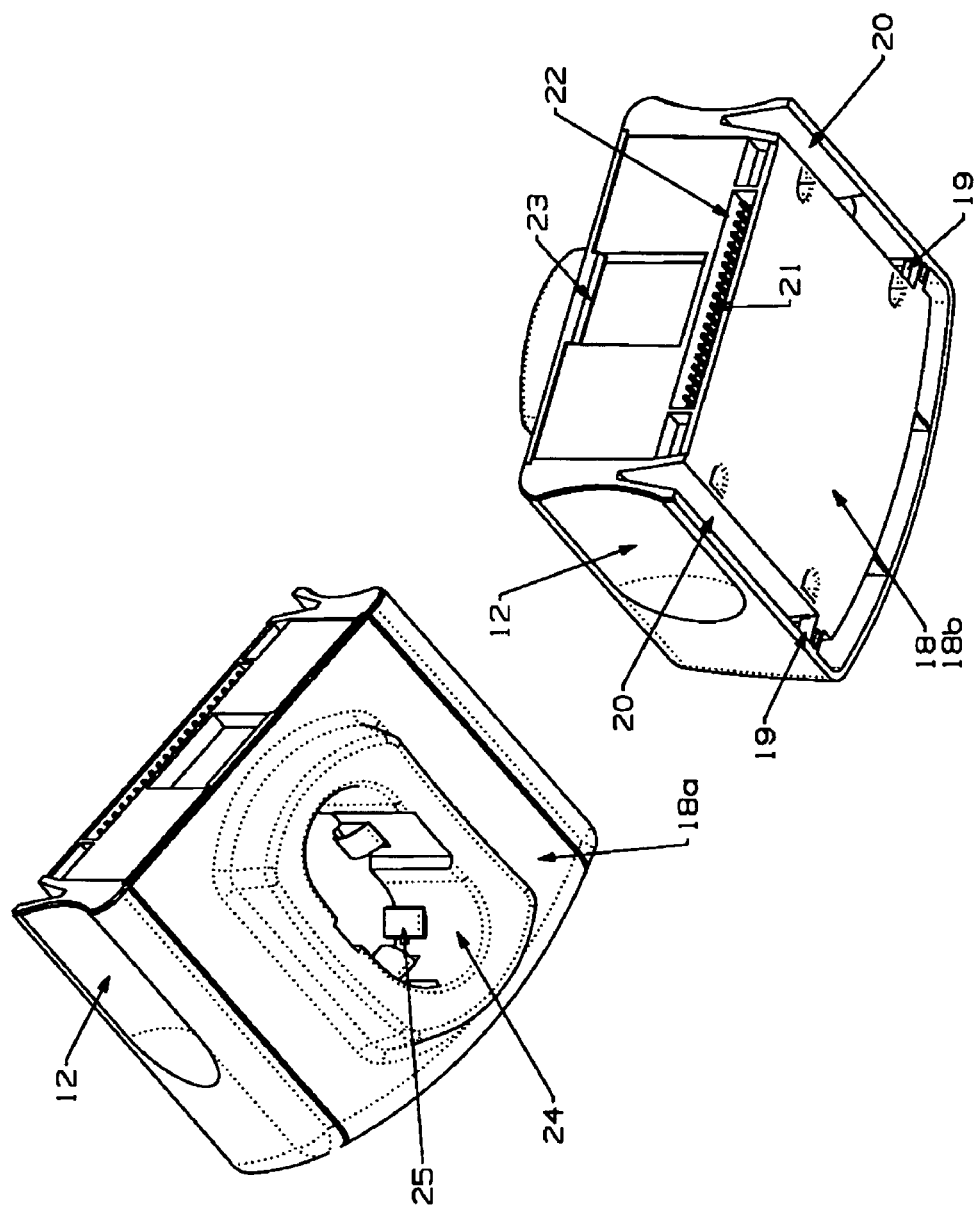
FIG. 2 is a diagram of the cradle body.
Figure 3:
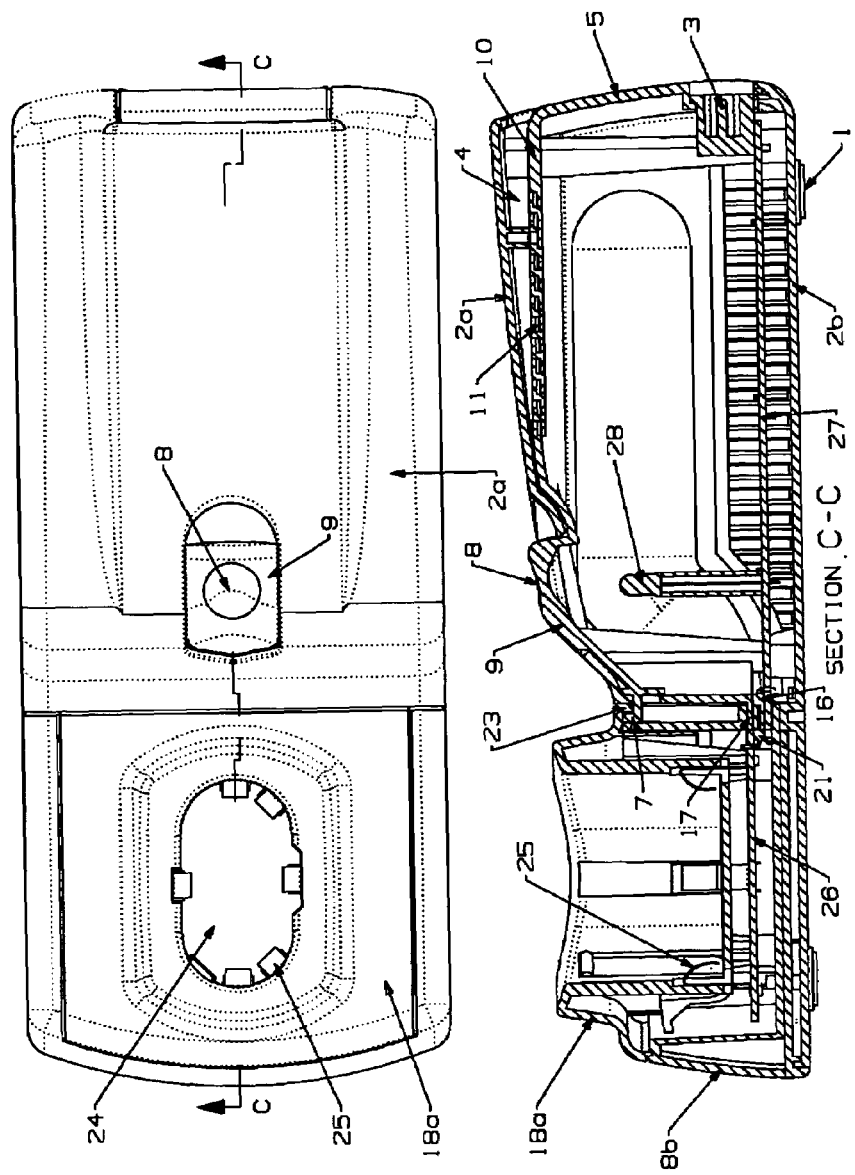
FIG. 3 is a diagram of the power tool battery charger.
Figure 4:
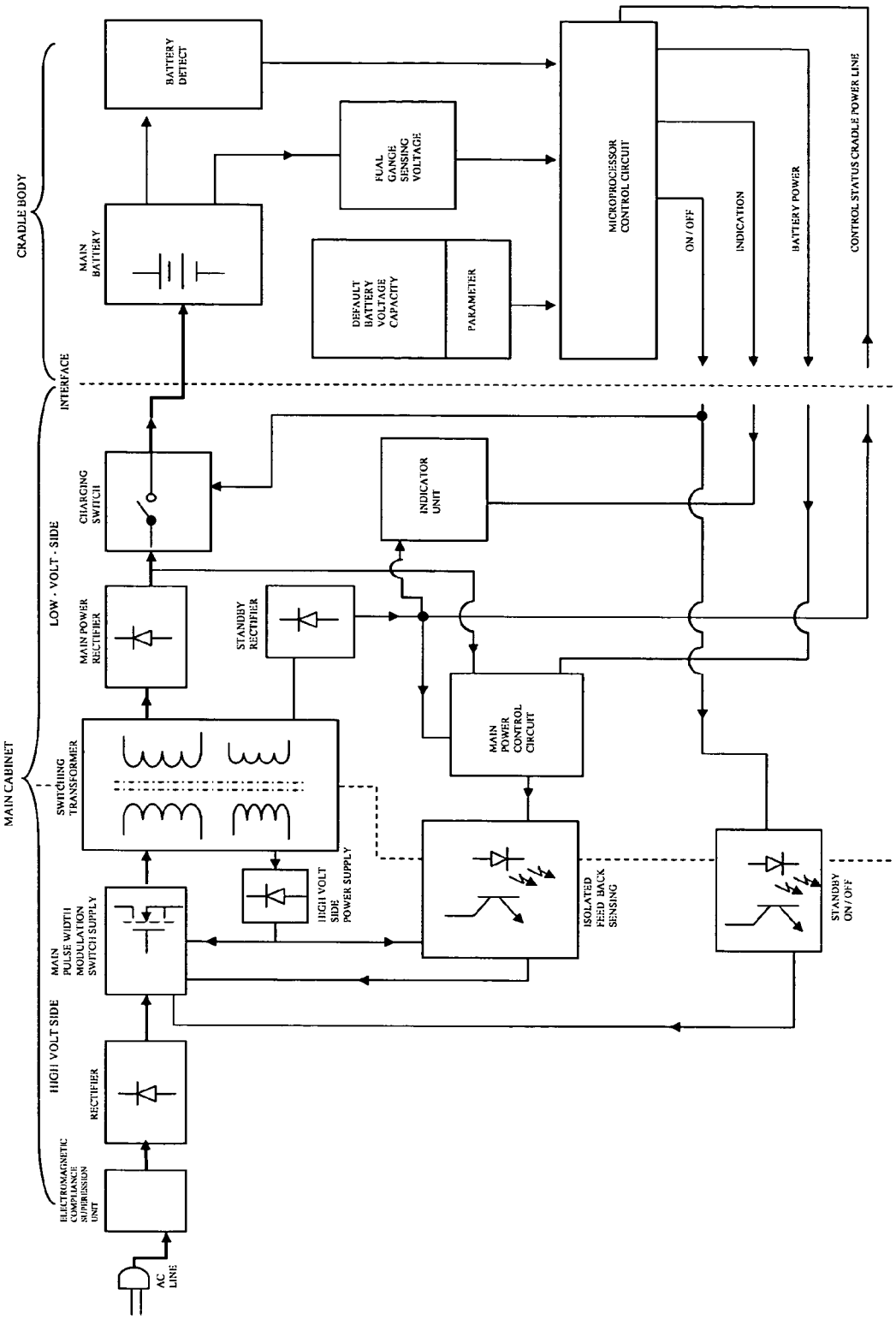
FIG. 4 is diagram of the power tool charging function.

The power tool charger comprises a housing or main cabinet body (2) and a detachable battery connector or cradle body (18). There are matching female pin connector (16) on the main cabinet body (2) and male pin connector (21) on the cradle body (18) for transmitting DC electrical power and numerous signal communications between the main cabinet body (2) and cradle body (18).

The main cabinet body (2) comprises top main cabinet (2a), bottom main cabinet (2b) and transparent integrated button/latch/back-plate (10). In the front of the main cabinet body (2), there is a platform (15) where the cradle body (18) resides. Near the two edges of the top of the platform (15), there are two ridges (13) where the cradle body (18) slides along and constrained in the sideway direction. The concave recess on the button (9) area of the transparent integrated button/latch/back-plate (10) also serves as a LED indicator (8), indicating the various charging condition of the battery. There is an AC inlet socket (3) located in the rear on the transparent back-plate (5). The main cabinet body (2) is rested on the four feet (1) located on the bottom side of it.

On the two lower side edges of the main cabinet body (1), there are arrays of ventilating slots (6) for fresh air intake. After the air passes by the transformer and ICs on the printed circuit board inside the main cabinet body (2), it is exhausted through the array of holes (11) on the integrated button/latch/back-plate (10) into the air passage (4) between and the underside of the top main cabinet (2a) and the integrated button/latch/back-plate (10) and then into the open air.

The cradle body (18) comprises the top cradle cabinet (18a) and bottom cradle cabinet (18b). On the top of the cradle body (18), there is a crater like battery cavity (24) which is specific for one or two brand(s) of power tool battery. On the inner side of the battery cavity (24), there are several charging contacts (25) for charging the battery and transmitting other signals from the battery to the cradle body (18). There are two V-shaped slots (20) for matching with the ridges (13) on the main cabinet body (2).

The cradle may accommodate the specific form factor either by being molded for a customized shape, or could be provided with modular inserts to accommodate different shapes. Similarly the contacts might be provided in a predetermined configuration customized for a particular battery, or be configurable for multiple types.

Changing of Cradle Body

By depressing the concave recess (8) of the button (9) of the integrated button/latch/back-plate (10), the latch (7) is lowered and disengaged from the ridge (23) on the cradle body (18). In sliding the cradle body (18) along the ridges (13), the hooks (19) at the end of the V-shaped slots (20) on the cradle body are disengaged from the undercuts (14) at the ends of the ridges (13) and the connector opening (22) on the cradle (18) is disengaged from the connector sheath (17) on the main cabinet body (2). By sliding a new version of cradle body (18) with the V-shaped slots (20) riding on the ridges (13) of the main cabinet body (2), the connector opening (22) of the cradle body (18) is engaged by the connector sheath (17) on the main cabinet body (2), and the hooks (19) at the end of the V-shaped slots (20) are engaged by the undercuts (14) at the end of the ridges (13). Finally the cradle body (18) is locked by the latch (7) of the integrated button/latch/back-plate (10) against the ridge (23) by snap action with the elasticity provided by the length of integrated button/latch/back-plate (10).

Electronic Configuration

The cradle body (18) houses the microprocessor control unit which detects the presence of battery inserted through the charging contacts (25). The DC power supply of the master control unit is provided by the main cabinet body (2) via the interfacing connectors (16)(21). In some cases the cradle (18) is designed simultaneously for two compatible form factors, signal from different charging contact (25) (due to different form factor) sensed is passed to the master control unit and the form factor is distinguished. The microprocessor control unit receives voltage signal from the battery by the fuel gauge and compares it with the different preset sets of battery voltage & capacity parameters to determine the nominal voltage and the percentage charged (correlated to the amount of deviation from the nominal voltage) of the electrical power in the battery inserted. The microprocessor control unit outputs on/off signal to the charging switch and the standby on/off unit (both are in the main cabinet body (2)) via the interfacing connectors (16) (21). It also outputs indication signal and battery power signal to indication unit and the main power control unit respectively (both are in the main cabinet body (2)) via the interfacing connectors (16)(21).

The microprocessor, Application Specific Integrated Circuit (ASIC) or other electronic device is preferably specifically programmed or configured for that battery type. For example the programming might ensure the charging regime takes into account:

specific battery chemicals eg: Ni—Cd, Ni-MH, Li-ion & lead acid.

specific battery voltage.

specific battery capacity.

Alternatively a single microprocessor could be programmed to sense or have input the type of battery, and customize the charging regime accordingly.

The main cabinet body (2) houses the adjustable power supply board. The adjustable power supply board is divided into high voltage section and low voltage section. In the high voltage section, the AC power input to the switching transformer is controlled by the main pulse width modulation switch supply. The DC power supply for functioning of the main pulse width modulation switch supply is provided by the AC power input via the electromagnetic compliance suppression unit and rectifier. The electromagnetic compliance suppression unit filters out any electrical surges from the power line preventing possible damage to the adjustable power supply board. The main pulse width modulation switch supply is controlled by signals from the high voltage power supply outlet of the switching transformer, isolated feedback sensing unit and the standby on/off unit and outputs the electrical power to the switching transformer. The transformer outputs high voltage DC power via the rectifier to the isolated feedback sensing unit and the main pulse width modulation switch supply.

In the low voltage section, the switching transformer outputs one low voltage DC power supply to the main power control circuit and the charging contacts (25) (in the cradle body (18)) via the main power rectifier, the charging switch and through interfacing connectors (16)(21). The charging switch is controlled by the on/off signal from the microprocessor control unit (in the cradle body (18)) via interfacing connectors (16)(21). The switching transformer outputs another low voltage DC power supply to the master control board (in the cradle body (18) via the interfacing connectors (16)(21)), the main power control unit, and the indication unit. The main power control unit receives battery power signal from the microprocessor control unit (in the cradle body (18) via the interfacing connectors (16)(21)) and signal from the main power rectifier and then outputs signal to the isolated feedback sensing unit. The charging standby on/off unit is controlled by signal from microprocessor control unit (in the cradle body (18) via interfacing connectors (16)(21)) and output signal to the main pulse width modulation switch supply.

Charging of Battery

With an AC power cable plug plugged into AC power main and the other end plugged into the AC power inlet (3) located in the transparent back-plate (5), the power tool charger is ready for charging of battery. With a power tool battery inserted into the battery cavity (24) of the cradle body (18), the main cabinet body (2) transmits DC electric power through the interfacing pin connectors (16) (21) to the charging contacts (25). The condition of "no battery", "charging" and "fully charged" is detected and indicated by the LED indicator (8) at the concave recess on the button (9) area of the transparent integrated button/latch/back-plate (10).

Each cradle body is configured for specific battery types. In a preferred embodiment, this includes accommodating the form factor of the battery while charging, and the microprocessor programmed for the specific battery charging requirements. This allows the main body to be standard for all battery types such that safety approval will be applied for the main body power supply. Hence, changing of cradle will not affect the approval.

Also because the interchangeable cradle is the front part of the charger, it allows the internal space of the housing (accommodating the bulky transformer etc) to be maximized, thus the output power is higher for a given size. The contacts for charging are assembled in the adaptor, so when the adaptor is changed for the different battery or device fitting, the contact positions can be changed as well.

A further advantage is achieved by the top air outlet which extends through the major part of the top surface, but is covered up inside a chamber which directs the air flow to its opening to the back side of the charger. This avoids any damage which might occur in having a smaller area vent which could be easily covered up.

A still further advantage is achieved through the cradle sliding in to attach to the charger body from the front, which allows easy changing of the cradle while the charger is placed on a shelf. Also because the cradle is expendable to the front it is able to receive the larger size batteries of devices.

The invention claimed is:

1. A battery charger comprising:
    a main cabinet comprising a power supply circuit configured to receive a supply voltage and provide a lower voltage at a connection terminal;
    a detachable battery cradle body comprising an electronic chaging control circuit and configured to receive a predetermined type of battery and to engage said main cabinet at said connection terminal; and
    said charging control unit within said battery cradle body receiving said lower voltage from said connection terminal and providing a charging voltage to said battery through a battery terminal appropriate for the battery type.

2. A battery charger as claimed in claim 1 further comprising a plurality of interchangeable battery cradle bodies to accommodate a plurality of different batteries, and said main cabinet configured to receive said plurality of cradle bodies.

3. A battery charger as claimed in claim 2, wherein each cradle body is configured for charging a battery of a specific capacity, voltage, chemical and/or form factor.

4. A battery charger as claimed in claim 3 further comprising a transparent portion of said main cabinet such that interior of said main cabinet may be visible externally.

5. A battery charger as claimed in claim 4 further comprising a latch or button for locking said cradle body in place and an indicator of charging condition within said latch or button.

6. A battery charger comprising:
    a main cabinet comprising a power supply circuit configured to receive a supply voltage and provide a lower voltage at a connection terminal;
    a detachable battery cradle body comprising an electronic charging control circuit and configured to receive said lower voltage from said connection terminal, engage said main cabinet, receive a predetermined type of battery and provide a charging voltage to said battery through a battery terminal; and
    wherein said cradle body is configured to provide a continuation of said main cabinet and thereby constitute a front portion thereof.

7. A battery charger as claimed in claim 6 further comprising a back-plate including exhaust holes and a button or latch, wherein said exhaust holes are sheltered by said main cabinet and an array of ventilating slots along the lower side edges of said main cabinet are indented inward so that tiny objects cannot fall into said main cabinet directly.

8. A battery charger as claimed in claim 7 further comprising an air passage between the underside of said main cabinet and said back-plate for exhaust of hot air from the inside of said main cabinet via said exhaust holes.

9. A battery charger as claimed in claim 8 further comprising concave recesses at the sides of said main cabinet and said cradle body, each recess terminating along a contour of the upper side edges of said main cabinet and said cradle body for easy gripping by fingers.

10. A battery charger comprising:
    a main cabinet comprising a power supply circuit configured to receive a supply voltage and provide a lower voltage at a connection terminal;
    a detachable battery cradle body comprising an electronic charging control circuit and configured to receive said lower voltage from said connection terminal, engage said main cabinet, receive a predetermined type of battery and provide a charging voltage to said battery through a battery terminal; and wherein said connector is configured to slide onto said main cabinet from the front.

11. A battery charger as claimed in claim 10 further comprising at least two ridges on said main cabinet in use serving as rails for said cradle body to slide and engage with corresponding V-shaped slots in said cradle body.

12. A battery charger as claimed in claim 11 further comprising undercuts at the end of said ridge to engage with corresponding hooks at the end of said V-shaped slots, to engage said cradle body in a locked position with said main cabinet.

13. A battery charger as claimed in claim 12 further comprising an interfacing connector sheath over said connection terminals including a hook in use for locking an interfacing connector opening of said cradle body in said locked position.

14. A battery charger as claimed in claim 13 wherein said interfacing connector opening shelters male interfacing connector pins on four sides from accidental impact damage.

* * * * *